(12) United States Patent
Wang (10) Patent No.: US 8,239,455 B2
(45) Date of Patent: Aug. 7, 2012

(54) COLLABORATIVE DATA AND KNOWLEDGE INTEGRATION

(75) Inventor: Fusheng Wang, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 480 days.

(21) Appl. No.: 12/231,862

(22) Filed: Sep. 5, 2008

(65) Prior Publication Data

US 2009/0070350 A1 Mar. 12, 2009

Related U.S. Application Data

(60) Provisional application No. 60/970,627, filed on Sep. 7, 2007.

(51) Int. Cl.
*G06F 15/16* (2006.01)
*G06Q 50/00* (2012.01)

(52) U.S. Cl. .................. 709/204; 705/2; 705/3

(58) Field of Classification Search .......... 709/204
See application file for complete search history.

(56) References Cited

U.S. PATENT DOCUMENTS

| | | | |
|---|---|---|---|
| 6,182,029 B1 * | 1/2001 | Friedman | 704/9 |
| 6,212,549 B1 * | 4/2001 | Page et al. | 709/205 |
| 6,334,124 B1 * | 12/2001 | Bouchard et al. | 1/1 |
| 6,367,418 B1 * | 4/2002 | Ulman et al. | 119/54 |
| 6,507,875 B1 * | 1/2003 | Mellen-Garnett et al. | 719/310 |
| 7,072,639 B2 * | 7/2006 | Marsh et al. | 455/406 |
| 7,702,639 B2 * | 4/2010 | Stanley et al. | 707/999.1 |
| 2002/0059425 A1 * | 5/2002 | Belfiore et al. | 709/226 |
| 2002/0156756 A1 * | 10/2002 | Stanley et al. | 706/47 |
| 2003/0078703 A1 * | 4/2003 | Potts et al. | 701/1 |
| 2004/0002818 A1 * | 1/2004 | Kulp et al. | 702/20 |
| 2004/0003132 A1 * | 1/2004 | Stanley et al. | 709/316 |
| 2004/0034550 A1 * | 2/2004 | Menschik et al. | 705/3 |
| 2004/0044650 A1 * | 3/2004 | Bova | 707/1 |
| 2004/0083217 A1 * | 4/2004 | Brackett et al. | 707/100 |
| 2004/0139222 A1 * | 7/2004 | Slik et al. | 709/236 |
| 2005/0154708 A1 * | 7/2005 | Sun | 707/3 |
| 2005/0192792 A1 * | 9/2005 | Carus et al. | 704/2 |
| 2005/0246314 A1 * | 11/2005 | Eder | 707/1 |
| 2006/0041564 A1 * | 2/2006 | Jain et al. | 707/100 |
| 2006/0184473 A1 * | 8/2006 | Eder | 706/20 |
| 2006/0271566 A1 * | 11/2006 | Mathias | 707/100 |
| 2007/0016450 A1 * | 1/2007 | Bhora et al. | 705/3 |
| 2007/0061393 A1 * | 3/2007 | Moore | 709/201 |

(Continued)

OTHER PUBLICATIONS

Fusheng Wang, Peiya Liu, John Pearson, Fred Azar, Gerald Madlmayr, "Experiment Management with Metadata-based Integration for Collaborative Scientific Research," 22nd International Conference on Data Engineering (ICDE'06), Apr. 2006.*

(Continued)

*Primary Examiner* — Emmanuel L Moise
*Assistant Examiner* — Robert Shaw (57) ABSTRACT

A framework for to enable collaborative research includes enabling scientific researchers to dynamically interact with others, collaboratively author, annotate, review, comment on others' data, and discuss their research. The framework allows for providing a dynamic collaboration environment by harnessing collective contributions from a group of researchers and facilitating broader participation of people into research projects. The framework is a Web-based collaborative platform to dynamically integrate information for scientific research. Besides data integration, the system provides essential collaboration capabilities to boost user participation and collaboration. The system will not only enable users as active information contributors to bring significant new values to the data, but also provide an environment for scientific researchers to do collaborative research in a large research community.

14 Claims, 3 Drawing Sheets

U.S. PATENT DOCUMENTS

| | | | |
|---|---|---|---|
| 2007/0081197 A1* | 4/2007 | Omoigui | 358/403 |
| 2007/0106536 A1* | 5/2007 | Moore | 705/3 |
| 2007/0124373 A1* | 5/2007 | Chatterjee et al. | 709/204 |
| 2007/0143302 A1* | 6/2007 | Stone | 707/10 |
| 2007/0179776 A1* | 8/2007 | Segond et al. | 704/9 |
| 2007/0208800 A1* | 9/2007 | Frohlich et al. | 709/203 |
| 2008/0040151 A1* | 2/2008 | Moore | 705/2 |
| 2008/0052112 A1* | 2/2008 | Zahlmann et al. | 705/2 |
| 2008/0052343 A1* | 2/2008 | Wood | 709/202 |
| 2009/0024587 A1* | 1/2009 | Kamani et al. | 707/3 |

OTHER PUBLICATIONS

Wang et al. "Experiment Management with Metadata-based Integration for Collaborative Scientific Research," 22nd International Conference on Data Engineering (ICDE'06), Apr. 2006.*

Sun et al. , Personal Workspace for Large-Scale Data-Driven Computational Experiment, GRID '06 Proceedings of the 7th IEEE/ACM International Conference on Grid Computing, 2006, pp. 112-119.*

Balsoy et al. Automating metadata Web service deployment for problem solving environments, Reed-Elsevier, 2005.*

Friedman et al, NLP-Based Encoding of Clinical Documents, JAMIA, vol. 1/No. 5 Sep.-Oct. 2004, pp. 392-402.*

Friedman et al. Architectural requirements for a multipurpose natural language processor in the clinical environment. In Proceedings of the 19th Annual Symposium on Computer Applications in Medical Care, (1995), pp. 347-351.*

Jang et al, Semantic Tagging for Medical Knowledge Tracking, Proceedings of the 28th IEEE EMBS Annual International Conference, Aug. 30-Sep. 3, 2006, pp. 6257-6260.*

Johnson, "A Semantic Lexicon for Medical Language Processing", JAMIA, vol. 6/No. 3 May-Jun. (1999) pp. 205-218.*

Wang et al. "Experiment Management with Metadata-based Integration for Collaborative Scientific Research", 22nd International Conference on Data Engineering (ICDE'06), Apr. 2006.*

Malet et al, A Model for Enhancing Internet Medical Document Retrieval with "Medical Core Metadata", JAMIA vol. 6/No. 2 Mar.-Apr. 1999, pp. 163-172.*

Murphy et al, Searching biomedical databases on complementary medicine: the use of controlled vocabulary among authors, indexers and investigators, BMC Complementary and Alternative Medicine (Jul. 2003).*

Sager et al. "Medical Language Processing with SGML Display" Proc AMIA Annual Fall Symp. 1996, pp. 547-551.*

Friedman et al, Representing Information in Patient Reports Using NLP and XML, JAMIA, vol. 6/No. 1 Jan.-Feb. 1999, pp. 76-87.*

Friedman et al, NLP-Based Encoding of Clinical Documents, JAMIA, vol. 11/No. 5 Sep.-Oct. 2004, pp. 392-402.*

Friedman et al. Architectural requirements for a multipurpose natural language processor in the clinical environment. In Proceedings of the 19th Annual Symposium on Computer Applications in Medical Care, (1995), pp. 347-351.*

Ceusters, W., et al.; "From syntactic-semantic tagging to knowledge discovery in medical texts", International Journal of Medical Informatics, 52 (1998), pp. 149-157.*

Pustejovsky et al Rerendering Semantic Ontologies Automatic Extensions to UMLS through Corpus Analytics, Proceedings of REC 2002 Workshop on Ontologies and Lexical Knowledge Bases (2002).*

Jang et al, Text Mining for Medical Documents Using a Hidden Markov Model, AIRS 2006, LNCS 4182, (2006) pp. 553-559.*

Ruch et al, "MEDTAG: Tag-like Semantics for Medical Document Indexing", JAMIA (1999), pp. 137-141.*

Johnson, "A Semantic Lexicon for Medical Language Processing", JAMIA, vol. 6/No. 3 May-Jun. 1999 pp. 205-218.*

Song et al , "Abbreviation Disambiguation Using Semantic Abstraction of Symbols and Numeric Terms,", IEEE NLP-KE'05 (2005), pp. 14-19.*

Serban et al., Formalization of medical guidelines exploiting medical thesauri, Proceedings of European Federation of Medical Informatics Special Topic Conference (2006).*

Rindflesch et al. "Semantic Processing for Enhanced Access to Biodmedical Knowledge", Real World Semantic Web Applications (2002).*

Hahn et al, MEDSYNDIKATE—Design considerations for an ontology-based medical text understanding system. Proceedings of the AMIA Annual Symposium, (2000), pp. 330-334.*

Haug et al, Experience with a mixed semantic/syntactic parser. InProceedings of the 19th Annual Symposium on Computer Applications in Medical Care, 1995, pp. 284-288.*

Hripcsak et al, "Unlocking clinical data from narrative reports: a study of natural language processing", Annals of Internal Medicine 122(9) (1995) pp. 681-688.*

Rassinoux et al, "Analysis of medical texts based on a sound medical model" In Proceedings of the 19th Annual Symposium on Computer Applications in Medical Care, (1995), pp. 27-31.*

Zweigenbaum et al, A multi-lingual architecture for building a normalized conceptual representation from medical language. In Proceedings of the 19th Annual Symposium on Computer Applications in Medical Care, (1995), pp. 357-361.*

P. Arzberger, et al., "Data Collaboratories in the Biomedical Community", Sep. 2002, http://nbcr.sdsc.edu/Collaboratories/CollaboratoryFinal2.doc, Sep. 4, 2008.

D. Atkins, et al., "Revolutionizing Science and Engineering Through Cyberinfrastructure", Jan. 2003, http://www.communitytechnology.org/nsf_ci_report/report.pdf, Sep. 4, 2008.

Y. Iaonnidis, et al., "ZOO: A Desktop Experiment Management Environment", in SIGMOD, 1997.

Z. Ives, et al., "Orchestra: Rapid, Collaborative Sharing of Dynamic Data", Procedings of CIDR, 2005.

T. O'Reilly, "What is Web 2.0", Sep. 2005, www.oreillynet.com/pub/a/oreilly/tim/news/2005/09/30/what-is-web-20.html., Sep. 4, 2008.

E. Stolte, et al., "Scientific Data Repositories—Designing for a Moving Target", in SIGMOD, 2003.

N. Taylor, et al., "Reconciling While Tolerating Disagreement in Collaborative Data Sharing", in SIGMOD, 2006.

B. Russell, et al., "LabelMe: the Open Image Labeling Tool", http://people.csail.mit.edu/brussell/research/LableMe/intro.html., Sep. 5, 2008.

T. Keller, et al., "Metadata: The Foundation of Effective Experiment Management", in First IEEE Metadata Conf., 1996.

* cited by examiner

COLLABORATIVE DATA AND KNOWLEDGE INTEGRATION

This application claims the benefit of U.S. Provisional Application No. 60/970,627 filed Sep. 7, 2007, which is incorporated herein by reference.

BACKGROUND OF THE INVENTION

The present invention relates generally to collaborative data integration and more particularly to collaborative information systems.

Scientific research has become increasingly reliant on collaborative effort among multiple institutions and interdisciplinary consortia which share scientific experiments and data and collaborate on analysis of data and results. Traditional data management and integration systems focus on passively integrating existing data. Thus, the collaboration among data providers and users is limited.

For example, the increased complexity of biomedical problems requires collaborative effort from multiple institutions and interdisciplinary consortia. The National Institutes of Health (NIH) provide large-scale collaborative project awards for teams of independently funded investigators to synergize and integrate their efforts. In this way, consortia are formed to pool expertise, validate approaches, forge common instrumentation platforms and rapidly translate new technologies toward clinical trials.

One example is the "Networks for Translational Research: Optical Imaging" (NTROI), which was structured to support four multi-site teams that would include broad national and international representation from academia, NIH intramural, and device and drug industry investigators. One team works on breast cancer research with Multi-Dimensional Diffuse Optical Imaging. The consortium consists of six research programs across multiple universities and hospitals and includes nearly one hundred researchers. Together with three other teams, there are several hundred researchers working on the problems of optical imaging. The researchers not located at the same sites are limited in how closely they are able to collaborate due to the distributed nature of such large scale research consortia.

However, current data integration systems only provide passive integration of existing data sources—a bottom up approach. There are several problems with this approach. First, schemas of data sources continue to evolve throughout the investigative process. This can disrupt integration. Second, data providers are generally not aware of changes and updates from other data sources. Also, they generally cannot contribute to such changes. That is, they are isolated to their own research and it is difficult for them to participate in collaboration with other researchers. Third, data users can only retroactively use data provided by others. The data users cannot proactively participate in active discussion, data reviewing, data authoring, or schema definition with other members due to the passive nature of traditional data integration. The lack of active collaboration can also cause disagreement in collaborative data sharing.

The distribution and large scale of scientific data also poses new challenges for scientific data management and integration. The warehouse based approach is difficult. Collecting large amount of image data over the Internet can be very slow. Additionally, researchers generally prefer having control of their data on a server located on their own labs instead of storing the data elsewhere. As a result, without pushing collaboration into a collaborative environment, information is becoming further isolated.

Further, the evolution of Web technology is transiting to a new paradigm. The term Web 2.0 refers to a second generation of services available on the World Wide Web that let people collaborate and share information online. For example, product purchasing sites (e.g., booksellers, clothiers, etc.) use users and/or readers as contributors, contributory knowledge sites (e.g., wikipedia, etc.) allow all content to be authored by users, weblogs generate content through participation (e.g., comments, etc.) instead of publishing only, and peer-to-peer file sharing sites (e.g., USENET, Bit-Torrent, Gnutella, FastTrack, etc.) radically decentralize data and the systems work by large scale participation of users. The Web is now shifting to strong interaction, participation, trust, and decentralization.

Therefore, for such large scale networks of research, a collaborative environment and data integration system for researchers to easily manage, collaborate, share, and review their experiments and results is needed.

BRIEF SUMMARY OF THE INVENTION

The present invention provides methods and systems for collaborative data management. A system for collaborative data management includes a central server with a plurality of collaborative engines. The central server receives information from a plurality of local servers and coordinates information transfer between the plurality of local servers and between the local servers and the central server. The central server's collaborative engines include a metadata engine, a schema engine, a hierarchy engine, and a messaging engine.

The local servers each have similar local collaborative engines, the plurality of local servers adapted to transfer information to the central server and the plurality of local servers via the central server.

These and other advantages of the invention will be apparent to those of ordinary skill in the art by reference to the following detailed description and the accompanying drawings.

DETAILED DESCRIPTION

The present invention generally provides methods and apparatus for a Web-based collaboration platform. A collaborative information integration platform enables sharing and co-authoring of schemas to achieve agreement on common data structures and semantics. It also facilitates collaborative tagging of data to improve search and personal organization of data through adding free tags or semantic tags. Users of a collaborative information integration platform may collaboratively review and analyze data to help improve the quality of data and experiments. The collaborative information integration platform also enables collaborative authoring of data to generate complete results and collaborative annotating of images with a Web-based tool to support collaborative annotation from multiple users. Additionally, personalized message exchange within the collaborative information integration platform keeps users updated on changes, activities, or related operations, and links users together in the research consortia.

Figure 1:
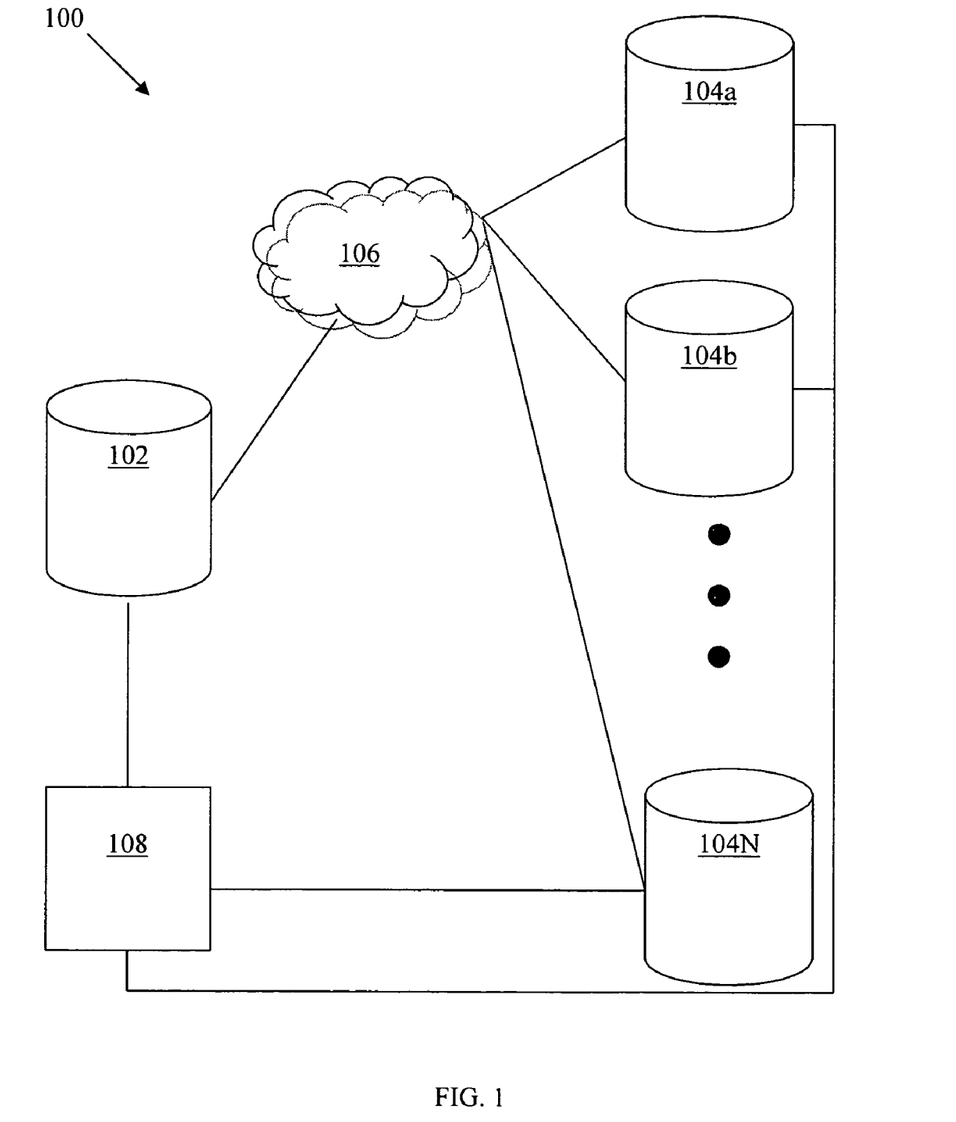
FIG. 1 depicts a collaboration system according to an embodiment of the present invention.

FIG. 1 depicts a collaboration system 100 according to an embodiment of the present invention. Collaboration system 100 includes a central server 102. Central server 102 is in communication with a plurality of local servers 104a, 104b, ..., 104N via a network 106. Central server 102 may also be in communication with one or more users 108. In at least one embodiment, users 108 are also in communication with local servers 104a-104N. In the same or alternative embodiments, users 108 are in communication with central server 102 and/or local servers 104a-104N via a network, such as network 108. In this way, collaboration system 100 is organized as a peer-to-peer network capable of sharing, transferring, and/or integrating data and/or information. As used herein, a device (e.g., central server 102, local servers 104a-104N, users 108, etc.) is in communication with another device if it is coupled to or otherwise connected via one or more networks, switches, wires, wireless networks, or the like such that the devices can transfer information, data, and/or metadata therebetween.

Central server 102 may be any appropriate server or computer, such as the computer 300 discussed below with respect to FIG. 3. In this way, central server 102 is a directory server for data and/or metadata for collaboration information (e.g., experiments, etc.). Central server 102 keeps a directory of all experiments and transformations (e.g., steps or processes to perform experiments) by indexing metadata documents (e.g., extensible markup language (XML) documents, etc.), and also keeps a single hierarchical organization of all transformation instances from local servers 104a-104N with links to the storage locations (e.g., uniform resource locator (URL), etc.) at local servers 104a-104N. This central directory architecture of central server 102 provides an integrated view of experiments across the collaboration system 100.

Local servers 104a-104N may be any appropriate servers or computers, such as the computer 300 discussed below with respect to FIG. 3. In collaboration system 100, local servers 104a-104N host data (e.g., data related to experiments, etc.) and publish metadata documents to central server 102, and central server 102 provides a "virtual" view of all published data from multiple local servers. That is, central server 102 enables each local server 104a-104N in the collaboration system 100 to view data that is not stored at that particular local server 104a-104N. Each local server 104a-104N is a peer node in collaboration system 100 that can work independently as a server for managing scientific experiments for a local institution or project.

Network 106 may be any appropriate wired and/or wireless global and/or local network. In at least one embodiment, network 106 is and/or employs the Internet and the World Wide Web (Web). In this way, collaboration system 100 is a Web-based system.

Users 108 are any users (e.g., computers, systems, servers, clients, etc.) permitted access to all or a portion of collaboration system 100. For example, a local computer associated with one of the local servers 104a-104N may be a user and may, in some embodiments have access to that local server and/or central server 102.

In operation, collaboration system 100 uses metadata to describe experiments and their transformations, and link experiment data together through metadata. Metadata of experiments may be represented as XML documents. Accordingly, the metadata can be easily indexed and searched at central server 102 and/or local servers 104a-104N through standard XML query languages. The metadata document and the associated data files preserves all the information of a transformation. To provide maximum flexibility, the schemas of metadata can be customized at local servers 104a-104N by describing them in a unified interface using XML. Of course, any other appropriate method of describing data using metadata may be used.

As used herein, transformations are the fundamental object in scientific experiments which encodes an element of an experimental input/output process in enough detail that the process could be repeated by others. A transformation comprises a transformer, input, output, operator, and the setting parameters. Individual "atomic" level transformations can be linked into larger transformation pipelines at central server 102.

In operation, collaboration system 100 enables local servers 104a-104N to use common transformations in local experiments. Collaboration system 100 also enables local servers 104a-104N to share and co-author schemas through central server 102. This can reduce or eliminate data disagreement.

Figure 2:
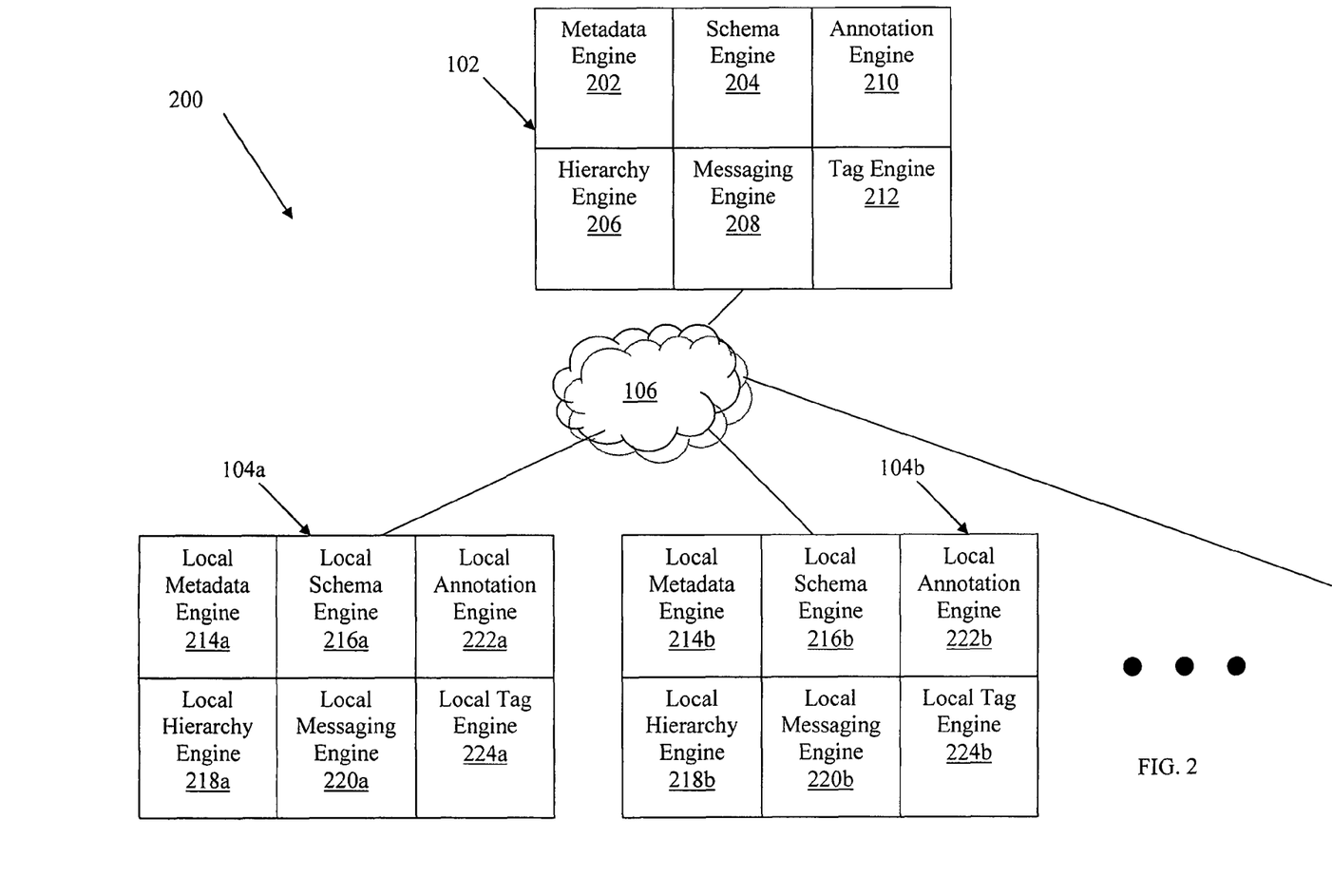
FIG. 2 depicts a schematic diagram of a portion of collaboration system 100 according to an embodiment of the present invention.

FIG. 2 depicts a schematic diagram of a portion 200 of collaboration system 100 according to an embodiment of the present invention. Central server 102 includes a number of collaborative engines such as metadata engine 202, schema engine 204, hierarchy engine 206, messaging engine 208, annotation engine 210, and tag engine 212. Local servers 104a-104N have analogous collaborative engines such as local metadata engines 214a-214N, local schema engines 216a-216N, local hierarchy engines 218a-218N, local messaging engines 220a-220N, local annotation engines 222a-222N, and local tag engines 224a-224N. Any appropriate combination of hardware, databases, and/or software may be used at central server 102 to implement metadata engine 202, schema engine 204, hierarchy engine 206, messaging engine 208, annotation engine 210, and tag engine 212. Similarly, any appropriate combination of hardware, databases, and/or software may be used at local servers 104a-104N to implement local metadata engines 214a-214N, local schema engines 216a-216N, local hierarchy engines 218a-218N, local messaging engines 220a-220N, local annotation engines 222a-222N, and local tag engines 224a-224N. For example, a server or computer such as computer 300, discussed below with respect to FIG. 3 may be used to provide these engines. One of skill in the art will recognize that, though discussed herein as separate components and individual engines of central server 102 and local servers 104a-104N, these engines 202-224 may be implemented logically and/or structurally as the same components in the respective servers. That is, for example central server 102 may use a single database (not shown) in coordination with one or more methods and/or software overlays to implement the features and functions of engines 202-212, even if separate engines are not used. The various features and functions of metadata engine 202, schema engine 204, hierarchy engine 206, messaging engine 208, annotation engine 210, tag engine 212, local metadata engines 214a-214N, local schema engines 216a-216N, local hierarchy engines 218a-218N, local messaging engines 220a-220N, local annotation engines 222a-222N, and local tag engines 224a-224N are described below with respect to the use of collaboration system 100. In other words, the engines are described herein to facilitate understanding of the invention and the central server 102 and the local servers 104a-104N are adapted to perform the functions described regardless of any division of hardware and/or associated software within central server 102 and the local servers 104a-104N.

Data associated with experiments and metadata associated with the data is stored on local servers 104a-104N. Additionally, metadata schemas that describe metadata documents, annotations on images, reviews on documents, and message repositories may also be stored on local servers 104a-104N, such as at local metadata engines 214a-214N and/or other local engines. The local servers 104a-104N use a hierarchy within local hierarchy engines 218a-218N that classifies data organizationally and local tag engines 224a-224N (e.g., a local tag repository) that preserves information regarding previously used tags.

Central server 102 keeps a global repository of metadata at metadata engine 102, metadata schemas at schema engine 204, hierarchies at hierarchy engine 206, and tags at tag engine 212. Central server 102 also keeps a repository of messages generated by the central server 102 at messaging engine 208. In at least one embodiment, central server 102 does not store data but stores one or more addresses (e.g., URLs) pointing to the data stored at local servers 104a-104N.

Central server 102 provides two major functionalities. It first provides a global but transparent view of all data published at local servers 104a-104N (e.g., metadata, schemas, hierarchy, tags, etc.). Central server 102 actively synchronizes information between local servers 104a-104N and central server 102. The central server 102 also serves as a hub for enabling collaborative information management such as collaborative management of schemas via schema engine 204 and local schema engines 216a-216N and tags via tag engine 212 and local tag engines 224a-224N.

Schema engine 204 and local schema engines 216a-216N communicate to facilitate sharing and co-authoring of schemas. This allows users to achieve common agreement to define data structures and semantics, thus minimizing the possibility of schema inconsistency. Users at local servers 104a-104N can customize their own schemas for their experiments and transformations. Each schema of a transformation is represented as an XML document, and is associated with an owner at the respective local server 104a-104N.

Central server 102 is a centralized repository that includes all schemas authored from local servers 104a-104N. In at least one embodiment, only local users at local servers 104a-104N can author schemas. Local servers 104a-104N keep a cache of schemas at local schema engines 216a-216N that will be used by local users, and central server 102 keeps a collection of all schemas from local servers 104a-104N at schema engine 204. Local servers 104a-104N synchronize schemas with the central server 102. Cached schemas are refreshed when a local server 104a-104N reboots or when the schema is viewed. New schemas are published to central server 102 when there is an update of a schema at a local server 104a-104N. In this way, central server 102 serves as an information exchange hub, and only local servers 104a-104N actively perform synchronization.

When a user at a local server 104a-104N wants to author data for their experiments, the user needs first to find an existing schema through central server 102 as a template. Accordingly, local servers 104a-104N may communicate with central server 102 to search schema engine 204. After searching, if an appropriate schema is found, that schema may be cached and use as a template for data authoring. In at least one embodiment, a Web authoring interface may be automatically generated based on the schema. If in appropriate schema is not located in schema engine 204, a new schema may be created. In some embodiments, a Web-based schema authoring interface may be used at local servers 104a-104N. After a new schema is created, the schema is automatically synchronized to central server 102 at schema engine 204.

A user at local servers 104a-104N will not be able to edit an existing schema with both addition and deletion operations unless the schema is currently only used by the local server associated with the user, no data is associated with this schema yet, and the user is the owner of the schema. If the schema is already used by multiple local servers 104a-104N, schema editing is forbidden, but extension is possible. A user can extend a schema (e.g., invoke schema versioning) if the schema is close to the desired schema but needs extra additions. In collaboration system 100, only backward-compatible schema extension is possible. Thus, original schema elements can only be added and not removed. Schema versioning provides significant benefits for schema-based queries. Specifically, queries defined based on a latest versioned schema can always cover schemas of its ancestors. Additionally, if editing and extension of a schema is not possible or sufficient enough for a new transformation, users at local servers 104a-104N can then create a new schema. On central server 102, each schema is preserved with information about local servers 104a-104N that currently cache and use that schema. This will precisely account sharing information of transformation schemas.

Users at local servers 104a-104N (e.g., collaborators) may define schemas collaboratively or propose a new schema and then invite comments. Collaboration system 100 provides the mechanism to collaboratively author schemas. Specifically, when a schema is authored at a local server 104a-104N, the owner of the schema can set a status of this schema as "draft", and invite other users at local servers 104a-104N to edit the schema. After a draft schema is created, it is propagated to central server 102. If a user is assigned as an author, the local server 104a-104N used by this user will download this draft schema when synchronization is performed. When the user finishes the editing of the schema, the schema is sent back to central server 102. The local server 104a-104N of the schema owner will be updated with the different revisions of the schema, and the owner can continue to update the schema or pick up a revised version and set it as a "final" state. In at least one embodiment, only the owner can change a "draft" schema to "final." When a draft schema is changed into the final state, the schema is not updatable any more by other users.

Collaboration system 100 also enables collaborative data tagging to improve search and organization of data. As discussed below, tag engine 212 of central server 102 and local tag engines 224a-224N may be used to facilitate data tagging by enabling addition of free tags and/or semantic tags (e.g., tags defined in a vocabulary), and sharing tags among multiple local servers 104a-104N and users 108.

Tagging is a method to enable users to add keywords to resources to improve search and organization. In collaboration system 100, data are hierarchically organized according to the organizational structure of a research consortium (e.g., a user of a local server 104a-104N). In practice, it may be helpful to allow users to provide additional classification of data by assigning tags to documents. Each document can be flexibly annotated with one or more tags and tags themselves can be shared by users at both local servers 104a-104N and the central server 102. Generally, two types of tags are used—free tags and semantic tags. Free tags are arbitrary tags created by users and semantic tags are tags that are predefined in a controlled tag vocabulary.

Free tagging is generally used by Web-based tagging systems where users can define arbitrary tags. Two categories of free tagging are organizational tagging, where users develop a personal standard to create new tags, and social tagging, where users try to express opinions regarding the quality of the resources. One issue for free tagging is that, since there is no common vocabulary among these tags, there can be semantic mismatch between tags. To combat this, collaboration system 100 adds semantic tags from predefined ontology and/or controlled vocabulary, such as the National Cancer Institute (NCI) Enterprise Vocabulary Services (EVS) and Unified Medical Language System. By standardizing tags using such controlled vocabulary, collaboration system 100, through tag engine 212 and/or local tag engines 224a-224N, can provide a controlled set of semantic tags. Data can be categorized into multiple semantic groups, which makes it possible to express queries based on common semantics.

Using a collaborative tag management system, tag engine 212 and/or local tag engines 224a-224N facilitates sharing of free tags among users through central server 102 and provides automatic tag lookup in a controlled vocabulary repository by caching previously retrieved tags in central server 102. While users at local servers 104a-104N can define and manage their own tags individually using local tag engines 224a-224N, central server 102 and tag engine 212 allow these tags to be shared by all collaborative users at other local servers 104a-104N. Sharing common tags can minimize the number of tags, and make it possible to classify data and query data based on a small set of tags. Tag engine 212 serves as a repository for shared free tags so a user at a local server 104a-104N can automatically lookup a tag from tag engine 212 before creating a new tag.

Tags are cached in the tag engine 212 to exploit locality inherent to the subset of the vocabulary that is used within a group of researchers. Since a collaborative research consortium often focuses on solving a single problem, the vocabulary is quite smaller than a standardized vocabulary. Central server 102 also provides a cached vocabulary repository. In this way, previously retrieved tags from the standardized vocabulary are shared among all users. Cached vocabulary on central server 102 makes it very efficient for a user at local servers 104a-104N to search for a tag in the vocabulary. Instead of searching for a tag at a remote large vocabulary, previously used tags in the tag cache repository on central server 102 can be searched first.

At each local server 104a-104N, local tag engine 224a-224N serves as a tag repository that manages all tags on this local server. Users can dynamically search and retrieve tags from a controlled vocabulary, as discussed above. Once a tag is defined on the local server (e.g., at local tag engine 224a-224N), it will be automatically cached at tag server 212. When a user wants to associate a tag to its data, tag engine 212 can be dynamically searched and tab may be selected through automatic tag lookup.

Automatic tag lookup using tag engine 212 and/or local tag engines 224a-224N may be used when a user wants to add a tag. In at least one embodiment, such an automatic lookup is based on Asynchronous JavaScript and XML (Ajax) technology. Accordingly, as a user types a keyword on a web page to search for a tag, there will be an automatic tag lookup from three resources—local tag engines 224a-224N, the cached/shared tag engine 212, and a controlled vocabulary. The lookup will dynamically load a dropdown list of tags from which the user can choose a tag. By dynamically sending asynchronous tag queries to tag engines, users can immediately select a desired tag to label data instead of opening multiple browser windows to do separate searches. In this way, tags from a controlled vocabulary or shared repository are used with a convenient interface. Of course, one of skill in the art would recognize that any other appropriate method for tag interaction may be used.

Collaboration system 100 also provides a mechanism to support collaborative authoring of documents and collaborative reviewing of documents. Through central server 102 every metadata document can be reviewed and commented on. In at least one embodiment, comments from users to a transformation document are stored in a comment XML document at central server 102. When a new comment is added, a message to the owner of the document is automatically generated and stored in a local message queue, such as at local messaging engines 220a-220N. When the owner of the commented document logs into collaboration system 100, a message about this new comment may be automatically displayed.

Central server 102 facilitates a cooperative authoring environment based on invitation-based authoring. Each metadata document for a transformation has a primary owner, who is the creator of this document. After authoring the document, the owner can submit an invitation to the document. In at least one embodiment, the owner may use a form with the email and a temporary password, together with the subject and description of this invitation. When the invited user clicks on a link, the editing page for this document will be provided. The newly edited document may be temporarily stored in the same or a similar location at central server 102. After a revision, a message may be added to a message queue targeted to the owner. If further authoring of the document is needed, the owner can then send a new invitation as described above.

Even further, collaboration system 100 enables medical image annotation. Generally, to annotate an image, a specific region of the image is highlighted and a textual note is added to describe this area. Central server 102 uses a Scalable Vector Graphics (SVG) based approach to represent, author, and display annotations. SVG is a W3C standard language based on XML to define 2D vector graphics. SVG can be embedded into HTML pages and is natively supported by many conventional web browsers.

Users at local servers 104a-104N can interact with local annotation engines 222a-222N to draw interesting regions of any shape supported by SVG, including point, rectangular, circle, polygon, polyline, etc. After a graphical object is drawn to define a region, textual annotations can be added accordingly. Multiple users can collaboratively author annotations and the corresponding annotations can be displayed as different layers, such as differentiated by colors. The technique is implemented by using JavaScript to directly manipulate SVG DOM and the web browser will render the image in real time. The Web-based annotation makes it very convenient for users to add annotations directly through the Web, and provides significant benefits. Instead of a standalone annotation application running on a workstation, where only local users can author, now users at disparate local servers 104a-104N can browse images on the Web through collaboration system 100 (e.g., using annotation engine 210, etc.) at any place and time. Such collaborative annotation can be very helpful to analyze complex images through aggregated intelligence. Both graphical and textual annotations are represented and stored in XML, such as at metadata engine 202 and/or local metadata engines 214a-214N. These provide additional benefits in that annotations serve as additional metadata for images. Thus, central server 102 provides knowledge based retrieval of images. Additionally, shapes and annotations are defined by SVG standard in XML. As a result, central server 102 facilitates querying of both spatial objects and annotation text. Additionally, shapes authored by multiple users can be compared to find similarity, conflict, etc.

Collaboration system 100 also provides personalized message exchange using messaging engine 208 at central server 102 and/or local messaging engines 220a-220N at local servers 104a-104N. Messages are targeted to only related users. According to a priority, messages can be categorized as global messages, action messages, and notification messages.

Global messages are messages published by community coordinators and/or administrators through central server 102 that announce progresses and/or events to local servers 104a-104N. Action messages are messages that require a user to take certain action. For example, a user may be invited to co-author a metadata schema, or invited to make annotations on an image, as described above. Notification messages are related updates in the system. For example, as described above, a new schema may be extended by a previous schema owned by this user and a notification message may be broadcast.

Messages are generated when certain user operations occur that will lead to enough interest to some users. A message includes the author, the target, creation date, and the message body. A message body is further differentiated according to the message types defined above. For example, the body of an action message includes a title, a description, an action type, an action URL, and authorization information.

Each local server 104a-104N and central server 102 maintain a message repository, local messaging engines 220a-220N and messaging engine 208 respectively. Each local messaging engine 220a-220N maintains messages generated from local users targeted to local users, and messaging engine 208 maintains messages generated from central server 102, such as changes of schemas, invitation to author schemas, etc. Messages are generated through certain operations, such as announcement through central server 102, invitation for editing, reviewing or annotation, or notice of changes such as new schemas, new annotation, new comment, etc. Generated messages are sent to the messaging engine in the corresponding local server. When a user logs on to a local server 104a-104N, messages targeted to this user are retrieved and filtered according to the generation date. They are then stored as personalized messages in this user's personal space.

Of course, the above described functions of a collaborative data management system could be implemented in any appropriate form. For example, more than one computer or server may perform various functions of central server 102. Additionally, the above described methods of use may be implemented using a computer or machine readable medium, as described below with respect to FIG. 3.

Figure 3:
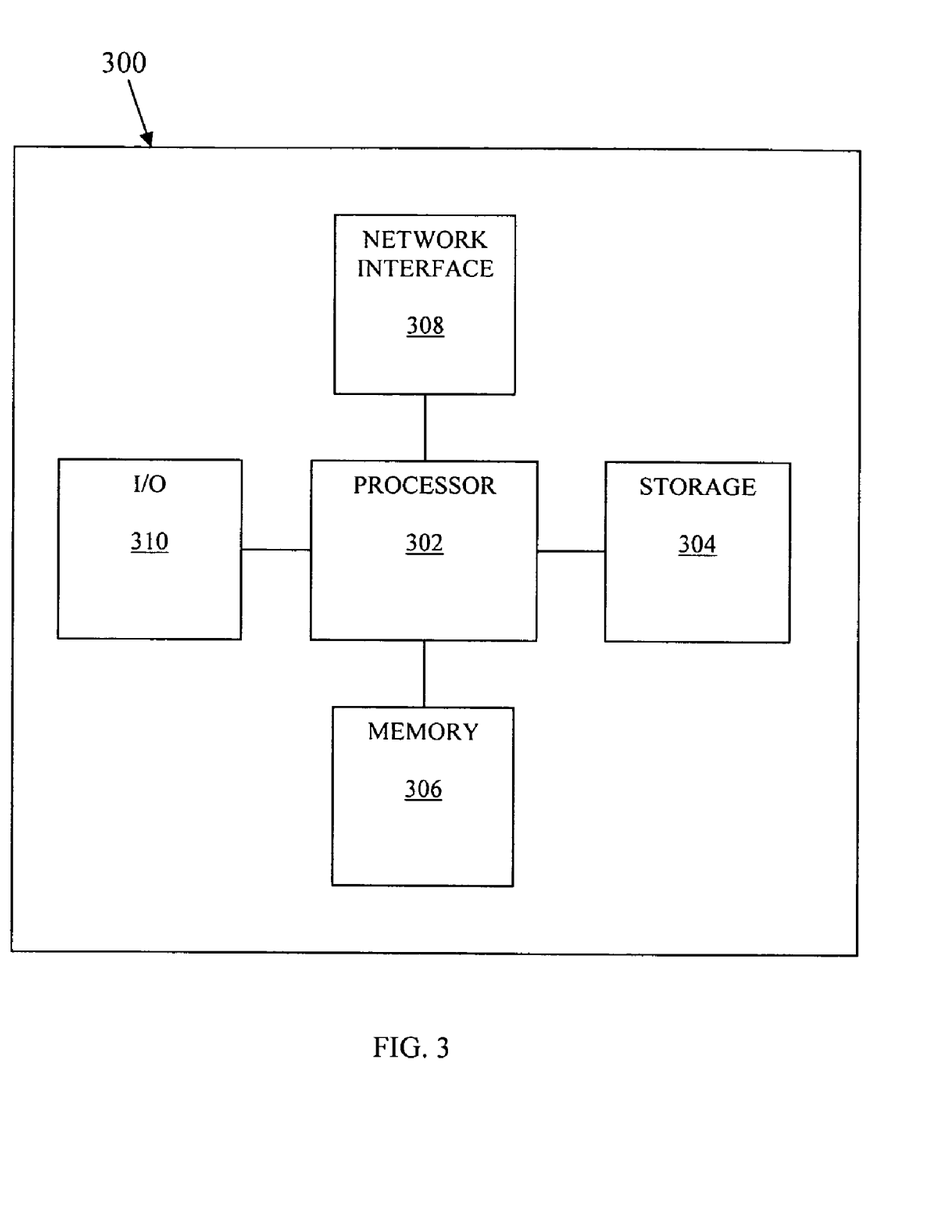
FIG. 3 is a schematic drawing of a computer.

FIG. 3 is a schematic drawing of a computer 300 according to an embodiment of the invention. Computer 300 may perform functions of central server 102 and/or local servers 104a-104N, as described above.

Computer 300 contains a processor 302 that controls the overall operation of the computer 300 by executing computer program instructions, which define such operation. The computer program instructions may be stored in a storage device 304 (e.g., magnetic disk, database, etc.) and loaded into memory 306 when execution of the computer program instructions is desired. Thus, applications for performing the herein-described operation are defined by the computer program instructions stored in the memory 306 and/or storage 304 and controlled by the processor 302 executing the computer program instructions. The computer 300 may also include one or more network interfaces 308 for communicating with other devices via a network. The computer 300 also includes input/output devices 310 (e.g., display, keyboard, mouse, speakers, buttons, etc.) that enable user interaction with the computer 300. Computer 300 and/or processor 302 may include one or more central processing units, read only memory (ROM) devices and/or random access memory (RAM) devices. One skilled in the art will recognize that an implementation of an actual controller could contain other components as well, and that the controller of FIG. 3 is a high level representation of some of the components of such a controller for illustrative purposes.

According to some embodiments of the present invention, instructions of a program (e.g., controller software) may be read into memory 306, such as from a ROM device to a RAM device or from a LAN adapter to a RAM device. Execution of sequences of the instructions in the program may cause the computer 300 to perform one or more of the method steps described herein, such as those described above with respect to functions of central server 102 and/or local server 104a-104N. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory 306 may store the software for the computer 300, which may be adapted to execute the software program and thereby operate in accordance with the present invention and particularly in accordance with the methods described in detail above. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled, and/or encrypted format. The programs furthermore may include program elements that may be generally useful, such as an operating system, a database management system, and device drivers for allowing the controller to interface with computer peripheral devices, and other equipment/components. Appropriate general purpose program elements are known to those skilled in the art, and need not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A system for collaborative management of scientific data comprising:
 a central server comprising a plurality of collaborative engines; wherein the central server is adapted to receive information from a plurality of local servers and coordinate information transfer between the plurality of local servers and between the local servers and the central server wherein the plurality of collaborative engines comprises:
 a metadata engine adapted to receive metadata indicative of experiment data from the plurality of local servers, store the metadata, and index the stored metadata; a schema engine adapted to receive one or more schemas from one or more of the plurality of local servers, store the one or more schemas received from the one or more of the plurality of local servers, transmit the one or more schemas received from the one or more plurality of local servers to the plurality of local servers, and facilitate collaborative authoring of the one or more schemas by users at different ones of the plurality of local servers; and
 a tag engine adapted to receive one or more free tags associated with the experiment data from the plurality of local servers, store the one or more free tags received from the plurality of local servers, and to automatically associate semantic tags with the experiment data by retrieving the semantic tags from a standardized scientific or biomedical vocabulary to provide a repository for free tags defined at the plurality of local servers and a cached vocabulary repository for previously retrieved semantic tags from the standardized scientific or biomedical vocabulary, to allow users at the plurality of local servers to look up tags from the repository of free tags and the cached vocabulary repository, and to update shared classification data by addition of free tags and/or semantic tags to the experiment data and exchange of the tags between the plurality of local servers; wherein the central server and each of the plurality of local servers comprise computing devices.

2. The system of claim 1 further comprising: a plurality of local servers, each comprising a plurality of local collaborative engines, the plurality of local servers adapted to transfer information to the central server and the plurality of local servers via the central server.

3. The system of claim 1 wherein the metadata engine is further adapted to link at least a portion of metadata indicative of experiment data stored at the plurality of local servers with at least another portion of metadata indicative of experiment data stored at the plurality of local servers.

4. The system of claim 1 wherein at least one of the plurality of collaborative engines is a hierarchy engine adapted to provide hierarchical structure to data.

5. A method of collaborative management of scientific data comprising:
  receiving, at a central server having a plurality of collaborative engines, information from a plurality of local servers; and
  coordinating information transfer between the plurality of local servers and between the local servers and the central server;
  wherein the plurality of collaborative engines comprises a metadata engine, a schema engine, and a tag engine, and the method further comprises:
  receiving, at the metadata engine, metadata indicative of experiment data from the plurality of local servers, storing the metadata, and indexing the stored metadata;
  receiving, at the schema engine, one or more schemas from one or more of the plurality of local servers and storing the one or more schemas received from the one or more of the plurality of local servers;
  facilitating collaborative authoring of the one or more schemas by users at different ones of the plurality of local servers;
  receiving, at the tag engine, one or more free tags associated with the experiment data from the plurality of local servers, storing the one or more free tags received from the plurality of local servers, and automatically associating semantic tags with the experiment data by retrieving the semantic tags from a standardized scientific or biomedical vocabulary, providing a repository for free tags defined at the plurality of local servers and a cached vocabulary repository for previously retrieved semantic tags from the standardized scientific or biomedical vocabulary;
  allowing users at the plurality of local servers to look up tags from the repository of free tags and the cached vocabulary repository, and updating shared classification data by addition of free tags and/or semantic tags to the experiment data and exchange of the tags between the plurality of local servers; wherein the central server and each of the plurality of local servers comprise computing devices.

6. The method of claim 5 further comprising: transferring information to the central server and the plurality of local servers via the central server.

7. The method of claim 5 further comprising: linking at least a portion of metadata indicative of experiment data stored at the plurality of local servers with at least another portion of metadata indicative of experiment data stored at the plurality of local servers.

8. The method of claim 5 further comprising: transmitting the one or more schemas received from the one or more plurality of local servers to the plurality of local servers.

9. The method of claim 5 further comprising: providing hierarchical structure to data with a hierarchy engine.

10. A non-transitory machine readable storage medium having program instructions stored thereon for collaborative management of scientific data, the program instructions when executed by a processor device, performing the steps of:
  receiving, at a central server having a plurality of collaborative engines, information from a plurality of local servers; and coordinating information transfer between the plurality of local servers and between the local servers and the central server wherein the plurality of collaborative engines comprises a metadata engine, a schema engine, and a tag engine, and the instructions further define the steps of:
  receiving, at the metadata engine, metadata indicative of experiment data from the plurality of local servers, storing the metadata, and indexing the stored metadata;
  receiving, at the schema engine, one or more schema; from one or more of the plurality of local servers and storing the one or more schemas received from the one or more of the plurality of local servers;
  facilitating collaborative authoring of the one or more schemas by users at different ones of the plurality of local servers;
  receiving, at the tag engine, one or more free tags associated with the experiment data from the plurality of local servers, storing the one or more free tags received from the plurality of local servers, and automatically associating semantic tags with the experiment data by retrieving the semantic tags from a standardized scientific or biomedical vocabulary; providing a repository for free tags defined at the plurality of local servers and a cached vocabulary repository for previously retrieved semantic tags from the standardized scientific or biomedical vocabulary;
  allowing users at the plurality of local servers to look up tags from the repository of free tags and the cached vocabulary repository, and updating shared classification data by addition of free tags and/or semantic tags to the experiment data and exchange of the tags between the plurality of local servers; wherein the central server and each of the plurality of local servers comprise computing devices.

11. The non-transitory machine readable storage medium of claim 10, wherein the program instructions further comprise the step of: transferring information to the central server and the plurality of local servers via the central server.

12. The non-transitory machine readable storage medium of claim 10, wherein the program instructions further comprise the step of: linking at least a portion of metadata indicative of experiment data stored at the plurality of local servers with at least another portion of metadata indicative of experiment data stored at the plurality of local servers.

13. The non-transitory machine readable storage medium of claim 10, wherein the program instructions further comprise the steps of: transmitting the one or more schemas received from the one or more plurality of local servers to the plurality of local servers.

14. The non-transitory machine readable storage medium of claim 10, wherein the program instructions further comprise the step of: providing hierarchical structure to data with a hierarchy engine.

* * * * *